(12) United States Patent
Prümm et al.

(10) Patent No.: US 9,500,153 B2
(45) Date of Patent: Nov. 22, 2016

(54) INTERNAL COMBUSTION ENGINE, IN PARTICULAR GAS ENGINE, FOR A MOTOR VEHICLE

(71) Applicant: MAN Truck & Bus AG, München (DE)

(72) Inventors: Franz Werner Prümm, Nürnberg (DE); Bruno Barciela, Nürnberg (DE); Joachim Weiβ, Oberasbach (DE)

(73) Assignee: MAN TRUCK & BUS AG, Munich (DE)

( * ) Notice: Subject to any disclaimer, the term of this patent is extended or adjusted under 35 U.S.C. 154(b) by 91 days.

(21) Appl. No.: 14/644,649

(22) Filed: Mar. 11, 2015

(65) Prior Publication Data

US 2015/0260120 A1 Sep. 17, 2015

(30) Foreign Application Priority Data

Mar. 12, 2014 (DE) .................. 10 2014 003 276

(51) Int. Cl.
*F02D 41/18* (2006.01)
*F02B 29/04* (2006.01)
(Continued)

(52) U.S. Cl.
CPC ........... *F02D 41/18* (2013.01); *F02B 29/0406* (2013.01); *F02B 29/0425* (2013.01); *F02D 41/0027* (2013.01); *F02M 21/0215* (2013.01); *F02M 21/0278* (2013.01); *F02M 21/0284* (2013.01); *F02M 21/04* (2013.01); *F02M 21/042* (2013.01); *F02M 35/1038* (2013.01); *F02D 19/027* (2013.01); *F02D 41/0047* (2013.01); *F02D 2200/0402* (2013.01); *F02D 2200/0404* (2013.01); *F02D 2200/0406* (2013.01);
(Continued)

(58) Field of Classification Search
CPC ............... F02D 19/027; F02D 19/028; F02D 19/0647; F02D 2200/04; F02D 2200/0402; F02D 2200/0404; F02D 2200/0406; F02D 2200/0408; F02D 2200/0411; F02D 2200/0414; F02D 2200/0416; F02D 41/0027; F02D 41/0047; F02D 41/005; F02D 41/18; F02D 41/182; F02B 29/0406; F02B 29/0425; F02M 21/04; F02M 21/042; F02M 26/02; F02M 26/03; F02M 26/04; F02M 26/05; F02M 26/23; F02M 35/1038
See application file for complete search history.

(56) References Cited

U.S. PATENT DOCUMENTS 5,191,789 A * 3/1993 Furuya ................ F02D 41/0007
73/114.33
6,588,261 B1 * 7/2003 Wild ..................... F02D 11/105
701/101

(Continued)

FOREIGN PATENT DOCUMENTS

DE 102005032067 A1 * 2/2006 ............. F02D 23/00
JP 2013155622 A * 8/2013 ............. F02D 45/00

*Primary Examiner* — Stephen K Cronin
*Assistant Examiner* — Kevin R Steckbauer
(74) *Attorney, Agent, or Firm* — Lucas & Mercanti, LLP

(57) ABSTRACT

An internal combustion engine, in particular a gas engine, for a motor vehicle, includes a charge air cooler arranged in an air mass flow feed upstream of an apparatus for mixing in fuel, and a measuring device for determining the air mass flow. The measuring device has a sensor system for measuring a pressure loss across the charge air cooler and a processing unit as evaluation unit for calculating the air mass flow at least from the pressure loss which is measured by the sensor system and a charge air cooler model stored in the processing unit. The charge air cooler forms a geometrically constant throttle for the air mass flow which is flowing through.

21 Claims, 2 Drawing Sheets

(51) Int. Cl.
  *F02D 41/00* (2006.01)
  *F02M 21/02* (2006.01)
  *F02M 21/04* (2006.01)
  *F02M 35/10* (2006.01)
  *F02D 19/02* (2006.01)

(52) U.S. Cl.
  CPC ............ *F02M26/05* (2016.02); *F02M 26/23* (2016.02); *Y02T 10/146* (2013.01); *Y02T 10/32* (2013.01)

(56) References Cited

U.S. PATENT DOCUMENTS

| | | | | |
|---|---|---|---|---|
| 6,644,029 B2* | 11/2003 | Weinreuter | ............ | F02B 37/12 60/598 |
| 6,715,287 B1* | 4/2004 | Engel | ................. | F02D 41/0007 60/601 |
| 7,003,390 B2* | 2/2006 | Kaga | .................... | F02D 41/182 701/101 |
| 7,079,937 B2* | 7/2006 | Tanaka | ................... | F02D 41/18 701/102 |
| 7,380,448 B2* | 6/2008 | Ueda | ....................... | F02B 37/16 73/114.33 |
| 7,418,857 B2* | 9/2008 | Tanaka | ............... | F02D 35/0023 73/114.34 |
| 7,546,760 B2* | 6/2009 | Konrad | ................... | F02D 41/18 73/114.33 |
| 7,805,939 B2* | 10/2010 | Kimoto | .................. | F02B 33/44 60/609 |
| 7,827,790 B2* | 11/2010 | Kimoto | .................. | F02B 33/44 60/607 |
| 8,181,509 B2* | 5/2012 | Ibuki | .................... | F02B 37/013 73/114.77 |
| 8,522,551 B2* | 9/2013 | Tomita | ................. | F02B 37/004 123/562 |
| 8,567,192 B2* | 10/2013 | Chi | ........................ | F02B 37/18 123/562 |
| 8,677,748 B2* | 3/2014 | Brahma | ................. | F02B 37/12 60/605.1 |
| 9,080,499 B2* | 7/2015 | Glugla | ................ | F02B 29/0418 |
| 9,175,597 B2* | 11/2015 | Katsumata | .......... | F02D 41/0007 |
| 9,206,751 B2* | 12/2015 | Herold | ................ | F02D 41/0007 |
| 9,309,826 B2* | 4/2016 | Wagner | ................. | F02D 41/263 |
| 2002/0166322 A1* | 11/2002 | Weinreuter | ............. | F02B 37/12 60/602 |
| 2006/0116808 A1* | 6/2006 | Tanaka | .................... | F02D 41/18 701/102 |
| 2006/0196182 A1* | 9/2006 | Kimoto | .................. | F02B 33/44 60/605.1 |
| 2006/0277907 A1* | 12/2006 | Ueda | ....................... | F02B 37/16 60/601 |
| 2007/0255483 A1* | 11/2007 | Tanaka | ................ | F02D 35/0023 701/101 |
| 2008/0051976 A1* | 2/2008 | Kimoto | .................. | F02B 33/44 701/103 |
| 2011/0154892 A1* | 6/2011 | Ibuki | .................... | F02B 37/013 73/114.79 |
| 2011/0167816 A1* | 7/2011 | Tomita | ................. | F02B 37/004 60/602 |
| 2011/0172898 A1* | 7/2011 | Eiraku | ................ | F02D 41/0007 701/103 |
| 2013/0074492 A1* | 3/2013 | Chi | ........................ | F02B 37/18 60/602 |
| 2013/0220284 A1* | 8/2013 | Katsumata | ............. | F02D 23/00 123/559.1 |
| 2014/0034026 A1* | 2/2014 | Katsumata | .......... | F02D 41/0007 123/559.1 |
| 2014/0048049 A1* | 2/2014 | Glugla | ................ | F02B 29/0418 123/563 |
| 2014/0326213 A1* | 11/2014 | Katsumata | ............ | F02D 41/107 123/399 |
| 2014/0373814 A1* | 12/2014 | Herold | ................ | F02D 41/0007 123/51 B |
| 2015/0240826 A1* | 8/2015 | Leroy | ................... | F04D 27/009 415/1 |
| 2015/0247447 A1* | 9/2015 | Leroy | ..................... | F02D 21/08 60/273 |
| 2015/0315960 A1* | 11/2015 | Thomas | ................. | F02B 37/04 123/564 |
| 2016/0053674 A1* | 2/2016 | Herold | ................ | F02D 41/0007 123/51 R |
| 2016/0103032 A1* | 4/2016 | Nakano | ................... | F02D 41/22 73/112.01 |
| 2016/0131057 A1* | 5/2016 | Lahti | ................... | F02D 41/0077 701/103 |

* cited by examiner

INTERNAL COMBUSTION ENGINE, IN PARTICULAR GAS ENGINE, FOR A MOTOR VEHICLE

CROSS REFERENCE TO RELATED APPLICATIONS

The present application claims priority of DE 10 2014 003 276.0, filed Mar. 12, 2014, which is incorporated herein by reference.

BACKGROUND OF THE INVENTION

The invention relates to an internal combustion engine, in particular a gas engine, for a motor vehicle and to a method for operating an internal combustion engine.

It is generally known to use a cooled and regulated exhaust gas recirculation means (EGR) in order to improve the degree of efficiency of an internal combustion engine, in particular a gas engine. As an addition of inert gas to the gas mixture, the recirculated exhaust gas counteracts a tendency to knock, with the result that an increase in the compression ratio and therefore an improvement in the degree of efficiency are possible in this way. In addition, an increase in the degree of efficiency in the part load range and weak load range takes place by way of a reduction in the gas exchange losses if an exhaust gas recirculation means is used.

For the operation of an internal combustion engine, fuel is metered into the associated air mass flow in a manner known per se depending on the performance requirement. A determination of the respective air mass flow which is as accurate as possible is necessary for predefined metering in of fuel:

In internal combustion engines without an exhaust gas recirculation means, it is known to determine the air mass flow by way of measurement of the manifold absolute pressure (MAP) according to an intake manifold pressure. Here, the cylinder filling is calculated via a model which reproduces the capacity of the engine depending on the rotational speed (volumetric efficiency model). In turn, the air mass flow of the entire engine is calculated from the cylinder filling, with the engine rotational speed being taken into consideration. However, this procedure is not possible in internal combustion engines with an exhaust gas recirculation means, in particular in gas engines with an exhaust gas recirculation means, since said exhaust gas recirculation means is not taken into consideration in the above calculation.

A determination of the air mass flow is also already known which is used in internal combustion engines, in particular in gas engines with an exhaust gas recirculation means (EGR). Here, the air mass flow in the air mass flow feed is measured directly with the aid of a special air mass flow rate meter before the fuel is mixed in and before the recirculated exhaust gas is mixed in. A hot-film air mass flow rate meter (HFM) is known for this purpose. A hot-film air mass flow rate meter of this type is expensive and can be susceptible to faults. In particular, an HFM has proven to be very susceptible to faults in natural gas engines designed to meet the Euro 5 standard on account of its sensitivity to dirt.

SUMMARY OF THE INVENTION

It is an object of the invention to propose an internal combustion engine, in particular a gas engine, and a method for operating an internal combustion engine of this type with a charge air cooler, by means of which internal combustion engine or method an alternative, inexpensive and functionally reliable determination of the air mass flow is possible.

An internal combustion engine, in particular a gas engine, for a motor vehicle is proposed which has a charge air cooler which is arranged in an air mass flow feed upstream of an apparatus for mixing in fuel and a measuring device for determining the air mass flow. According to the invention, a measuring device has a sensor system for measuring a pressure loss across the charge air cooler. Furthermore, the measuring device comprises a processing unit as evaluation unit, by means of which the air mass flow can be calculated or is calculated at least from the pressure loss which is measured by means of the sensor system in a charge air cooler model which is stored in the processing unit and in which the charge air cooler forms a geometrically constant throttle for the air mass flow which is flowing through.

In the present case, a model which is related to a certain component, for example the abovementioned charge air cooler model or the throttle valve model which will still be mentioned in the following text, is always a mathematical function and/or characteristic curves or characteristic maps which are/is stored in a processing unit, describe/describes said component, and by means of which a process variable is calculated depending on input signals which are predetermined in a defined manner.

In relation to the charge air cooler model, this means that the charge air cooler is a geometrically constant throttle here which is flowed through by an air mass flow and for which the air mass flow can be calculated at least from the pressure loss as an input signal which is measured by the sensor system. In addition to the pressure loss, it goes without saying that further parameters or input variables can also be taken into consideration, for example engine parameters, EGR parameters or the like. Here, a geometrically constant throttle is a throttle with a geometry, in which the pressure loss is substantially linear with respect to the mass flow which is flowing through the throttle.

The invention therefore utilizes the physical effect of the pressure loss of a throttle in a gas flow. As tests by the inventor have shown, a pressure loss of this type is approximately linear with respect to the mass flow which flows through the throttle. In specific terms, it is therefore necessary for the present determination of the air mass flow to determine the charge air cooler throttle characteristic in advance by way of measurements as a basis for the calculation.

Using the determination according to the invention of the air mass flow, a hot-film air mass flow rate meter (HFM) which is expensive and susceptible to faults can therefore advantageously be dispensed with.

The sensor system for measuring the pressure loss at the charge air cooler can be formed by in each case one pressure sensor upstream and downstream of the charge air cooler or, as an alternative, by a differential pressure sensor. In addition, at least one temperature sensor can also be used for measuring the temperature of the air mass flow, it then optionally being possible for the temperature to also be taken into consideration during the calculation in order to increase the accuracy.

In an internal combustion engine, in particular in a gas engine, the load requirement is usually predefined by an adjustable throttle valve in the air mass flow feed, which throttle valve therefore acts as a variable throttle. The air mass flow can therefore also be determined using the pressure loss across the throttle valve which is measured by a sensor system and the throttle valve position which is detected by the sensor system in a throttle valve model, in which the throttle valve is defined as a geometrically variable throttle which is flowed through by the air mass flow. In the weak load range and the lower part load range, the throttle action by way of the throttle valve is sufficiently high for the formation of pressure differences which can be measured satisfactorily and therefore for an accurate air mass determination. In the range close to full load with a largely open throttle valve, the pressure differences which can be measured are so low, however, that an air mass determination which is sufficiently accurate for metering in fuel is no longer satisfactorily possible on account of the flat characteristic curve in this range.

The throttle valve model is therefore a model, in which the throttle valve is assumed to be a geometrically variable throttle which is flowed through by an air mass flow and for which the air mass flow can be calculated at least from the pressure loss which is measured by the sensor system and the throttle valve position which is measured by the sensor system as input variables.

It is therefore proposed in one particularly preferred embodiment that the air mass flow is determined by the throttle valve model in the weak load range and is determined by the charge air cooler model in high load ranges. Both options result in sufficiently satisfactory results in the at least one middle load range which lies in between and can therefore be used alternatively or optionally in parallel for a continuous comparison, optionally in conjunction with lambda regulation.

The detection according to the invention of the air mass flow is advantageous in an internal combustion engine, in particular in a gas engine, which has an exhaust gas recirculation means (EGR) in the air mass flow feed, preferably downstream of the charge air cooler in the air mass flow feed. In one embodiment, the exhaust gas recirculation means is a regulated and/or cooled exhaust gas recirculation means, the proportion of recirculated exhaust gas then being calculated as EGR rate or EGR actual value by means of the processing unit. To this end, the entire mass flow comprising fresh air, combustion gas and recirculated exhaust gas is determined by way of measurement of the intake manifold pressure (manifold absolute pressure) using an MAP sensor in a volumetric efficiency model. The determined and therefore known air mass flow and the combustion gas mass flow are subtracted from the overall mass flow. The combustion gas mass flow can be determined via a respectively known injection duration of injectors and/or via a respectively known combustion air ratio from a lambda measurement by a lambda probe. The difference which then remains results in the proportion of currently recirculated exhaust gas as EGR rate or as EGR actual value.

This calculation of the EGR rate or the EGR actual value can then be regulated to predefined EGR setpoint values in a regulating circuit. An EGR regulator of this type can be integrated into an engine control unit just like the above-mentioned processing unit, it being possible for the EGR setpoint values to be stored in a characteristic map.

Since an air mass flow measurement using an HFM sensor has proven to be very susceptible to faults particularly in the case of gas engines, the alternative determination according to the invention of the air mass flow without an HFM sensor can be used particularly advantageously in gas engines.

The advantages which result by way of the method according to the invention and the likewise claimed vehicle are identical to the advantages mentioned above with respect to the internal combustion engine, with the result that reference is made to the above comments in order to avoid repetitions.

BRIEF DESCRIPTION OF THE DRAWINGS

One exemplary embodiment of the invention is explained in greater detail merely diagrammatically and by way of example using a drawing, in which.

DETAILED DESCRIPTION OF THE PREFERRED EMBODIMENTS

Figure 1:
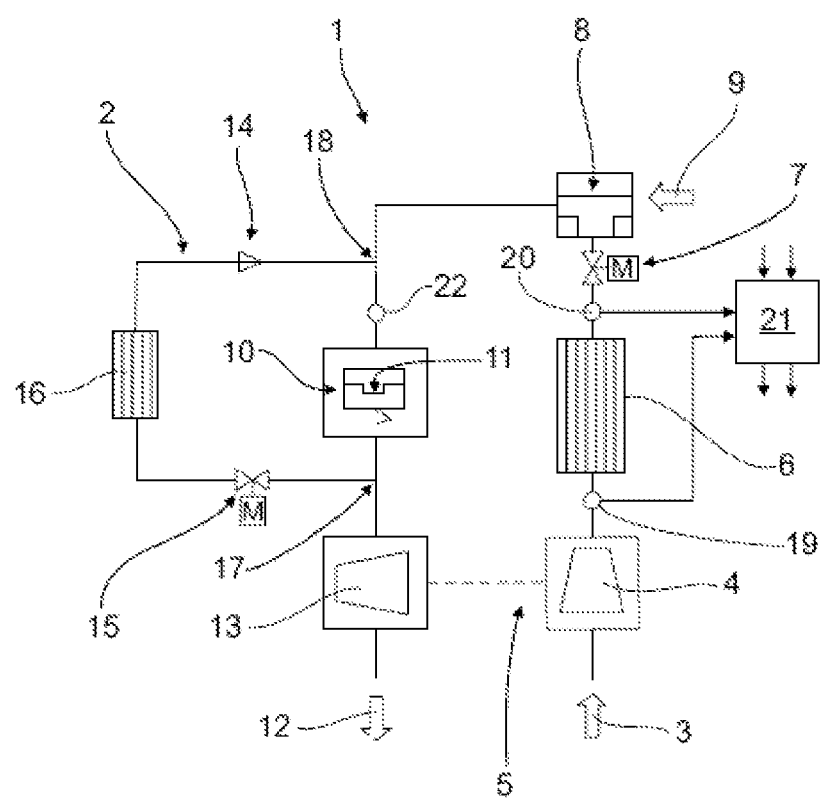
FIG. 1 shows a diagrammatic illustration of a natural gas engine with a regulated and cooled exhaust gas recirculation means.

FIG. 1 shows a diagrammatic illustration of an internal combustion engine as natural gas engine 1 with a regulated and cooled exhaust gas recirculation system 2.

An air mass flow (arrow 3) is guided through a charge air cooler 6 by way of a compressor 4 which is a constituent part of an exhaust gas turbocharger 5. From there, the cooled air mass flow 3 is fed via a controllable throttle valve 7 to a gas mixer 8, to which, furthermore, a gas mass flow (arrow 9) is fed. From there, the gas mixture flows to the intake manifold of the engine block 10 with its cylinder/piston units 11, in which the combustion process takes place. From there, an exhaust gas mass flow (arrow 12) flows via a turbine 13 of the exhaust gas turbocharger 5, the turbine 13 being coupled mechanically to the compressor 4 and driving the latter.

Upstream of the turbine 13, an exhaust gas recirculation mass flow (EGR mass flow) in accordance with 14 is branched off at a branching point 17 and is fed via an EGR control valve 15 and an EGR cooler 16 at a branching point 18 to the gas mass flow downstream of the gas mixer 8 and upstream of the engine block 10.

Here, in order to measure a pressure loss across the charge air cooler 6, a pressure sensor 19 is arranged in the air mass flow 3 upstream of the charge air cooler 6 (p-v CAC sensor) and, furthermore, a pressure sensor 20 (p-n CAC sensor) is arranged downstream of the charge air cooler 6. The measuring signals of the pressure sensors 19, 20 in accordance with a differential pressure are fed to a processing unit 21, in which the magnitude of the currently conveyed air mass flow 3 is calculated therefrom.

A pressure sensor 22 (preferably as MAP intake manifold pressure sensor) for measuring the intake manifold pressure is arranged upstream of the engine block 10 and downstream of the branching point 18, by way of which pressure sensor 22 the overall mass flow comprising fresh air, combustion gas and recirculated exhaust gas can be determined, for example, in the processing unit 21 in a volumetric efficiency model. The determined air mass flow 3 which was calculated across the pressure drop at the charge air cooler 6 by means of the pressure sensors 19, 20 can be subtracted from said overall mass flow. Furthermore, the gas mass flow 9 can be determined via a respectively known injection duration of injectors and/or via a respectively known combustion air ratio and can likewise be subtracted from the overall mass flow, with the result that the remaining difference then results in the proportion of currently recirculated exhaust gas as EGR mass flow in accordance with an EGR rate or an EGR actual value. Said EGR actual value is therefore calculated without being measured directly.

Figure 2:
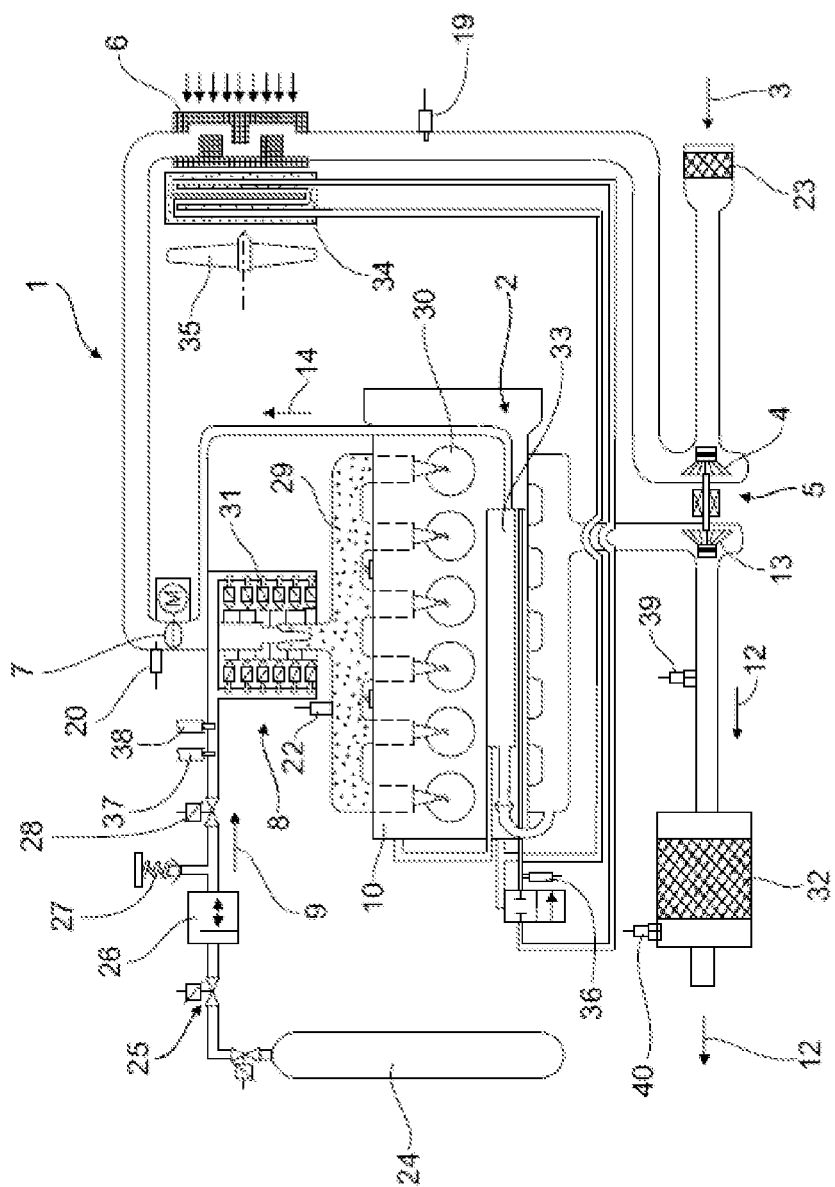
FIG. 2 shows a more concrete illustration in accordance with FIG. 1.

FIG. 2 shows the natural gas engine 1 from FIG. 1 in a more concrete illustration with further details, identical components from FIG. 1 being labelled with identical reference numerals.

It can also be seen here that an air mass flow (arrow 3) is fed via an air filter 23 to the compressor for the exhaust gas turbocharger 5 and is fed from there via the charge air cooler 6 and the throttle valve 7 to the gas mixer 8. In addition, the gas mass flow 9 is fed to the gas mixer 8 from a high pressure reservoir 24 for compressed natural gas (CNG high pressure reservoir for compressed natural gas) via a high pressure shut-off valve 25, a gas pressure regulator 26 in conjunction with a pressure relief valve 27 and a low pressure shut-off valve 28. The gas mixer 8 is connected to an intake manifold 29 on the engine block 10, connecting lines to the six cylinder/piston units 30 which are shown here merely by way of example emanating in each case from the intake manifold 29. Injector valves 31 are provided in the gas mixer 8 for metering in the gas mass flow 9.

The exhaust gas mass flow (arrow 12) is also guided here via the turbine 13 of the exhaust gas turbocharger 5 and via a catalytic converter which is arranged downstream of it, for example a 3-way catalytic converter 32, with a silencer. An EGR mass flow 14 is also branched off from the exhaust gas flow here and is recirculated via a cooled exhaust gas recirculation unit 33 between the throttle valve 7 and the gas mixer 8. Here, the cooling of the EGR mass flow 14 takes place indirectly via a coolant which is cooled to a predefined temperature which is detected by means of a coolant temperature sensor 36 in a water cooler 34 which is arranged here in a compact way between the charge air cooler 6 and a further associated fan 35. Here, the fan 35, the water cooler 34 which is assigned to it and the charge air cooler 6 which is assigned to them can be combined to form one structural unit or else can be formed by separate components which are merely assigned to one another. Furthermore, the p-v CAC sensor 19 and the p-n CAC sensor 20 are arranged in the air mass flow 3, both sensors 19, 20 preferably being equipped further with a temperature sensor.

In addition, the MAP intake manifold pressure sensor 22 is attached to the intake manifold 29. A CNG pressure sensor 37 and a CNG temperature sensor 38 are arranged in the gas line for the gas mass flow 9 upstream of the gas mixer 8.

Upstream of the catalytic converter 32, in addition, a broadband lambda probe 39 is arranged by way of example in the exhaust gas mass flow 12 and, downstream of the catalytic converter 32, a discrete-level lambda probe 40 is arranged.

It is also the case in the embodiment shown in more concrete terms of a natural gas engine 1 according to FIG. 2 that the respectively currently conveyed air mass flow 3 is determined via a pressure loss measurement by the pressure sensors 19, 20 across the charge air cooler 6, optionally in conjunction with a throttle valve model (not shown). The value which is obtained herefrom can be used, in particular, for EGR regulation.

LIST OF REFERENCE NUMERALS

1 Natural gas engine
2 Exhaust gas recirculation means
3 Arrow (air mass flow)
4 Compressor
5 Exhaust gas turbocharger
6 Charge air cooler
7 Throttle valve
8 Gas mixer
9 Arrow (gas mass flow)
10 Engine block
11 Cylinder/piston unit
12 Arrow (exhaust gas mass flow)
13 Turbine
14 EGR mass flow
15 EGR control valve
16 EGR cooler
17 Branching point
18 Branching point
19 p-v CAC sensor
20 p-n CAC sensor
21 Processing unit
22 MAP intake manifold pressure sensor
23 Air filter
24 High pressure reservoir
25 High pressure shut-off valve
26 Gas pressure regulator
27 Pressure relief valve
28 Low pressure shut-off valve
29 Intake manifold
30 Cylinder/piston unit
31 Injector valve
32 3-way catalytic converter
33 Exhaust gas recirculation unit
34 Water cooler
35 Fan
36 Coolant temperature sensor
37 CNG pressure sensor
38 CNG temperature sensor
39 Broadband lambda probe
40 Discrete-level lambda probe

The invention claimed is:

1. An internal combustion engine for a motor vehicle, comprising:
    an air mass flow feed;
    an apparatus for mixing in fuel;
    a charge air cooler arranged in said air mass flow feed upstream of said apparatus for mixing fuel, said charge air cooler forming a geometrically constant throttle for an air mass flow flowing therethrough; and
    a measuring device determining an air mass flow having a first sensor system measuring a pressure loss across said charge air cooler and a processing unit, wherein the processing unit is an evaluation unit configured to calculate the air mass flow flowing through said charge air cooler from at least the pressure loss measured by the first sensor system and a charge air cooler model that is stored in said processing unit.

2. The internal combustion engine according to claim 1, wherein said first sensor system comprises one of:
    a first pressure sensor upstream of the charge air cooler and a second pressure sensor downstream of the charge air cooler; or
    a differential pressure sensor measuring a pressure loss across the charge air cooler.

3. The internal combustion engine according to claim 2, wherein the first pressure sensor is a p-v CAC sensor and the second pressure sensor is a p-n CAC sensor.

4. The internal combustion engine according to claim 2, wherein the first sensor system further comprises a temperature sensor measuring a temperature of the air mass flow.

5. The internal combustion engine according to claim 1, further comprising a throttle valve and a throttle valve model stored in the processing unit, the throttle valve being a geometrically variable throttle for the air mass flow, the measuring device further comprising a second sensor system measuring a pressure loss across the throttle valve, and said processing unit calculates the air mass flow through the throttle valve from the pressure loss measured by the second sensor system, a throttle valve position of the throttle valve, and the throttle valve model.

6. The internal combustion engine according to claim 5, wherein the internal combustion engine has a weak load range and a high load range, in the weak load range of the internal combustion engine the processing unit determines the air mass flow using the throttle valve model, and in a high load range the processing unit determines the air mass flow using the charge air cooler model.

7. The internal combustion engine according to claim 6, wherein the internal combustion engine has a middle load range between the weak load range and the high load range, in the middle load range, the air mass flow is determined by one of the throttle valve model, the charge air cooler model, or a comparison of the throttle valve model and the charge air cooler model.

8. The internal combustion engine according to claim 7, wherein in the middle load range, the one of the throttle valve model, the charge air cooler model, or a comparison of the throttle valve model and the charge air cooler model is used with lambda regulation.

9. The internal combustion engine according to claim 1, further comprising an exhaust gas recirculation (EGR) system in the air mass flow feed downstream of the charge air cooler.

10. The internal combustion engine according to claim 9, further comprising a manifold pressure sensor measuring an intake manifold pressure, the processing unit determining an overall mass flow of fresh air, combustion gas, and EGR gas based on the manifold pressure sensor and a volumetric efficiency model,
wherein the processing unit determines a combustion gas mass flow by one of injector duration of injectors of the internal combustion engine or by a lambda measurement by lambda probes, and
wherein the processing unit determines a proportion of recirculated exhaust gas as EGR rate by subtracting the determined air flow mass and the combustion mass gas flow from the overall mass flow.

11. The internal combustion engine according to claim 10, wherein the processing unit regulates the EGR rate.

12. The internal combustion engine according to claim 1, wherein the internal combustion is a gas engine and is operated using natural gas.

13. A vehicle having an internal combustion engine according to claim 1.

14. A method for operating an internal combustion engine for a motor vehicle, comprising the steps of:
arranging a charge air cooler in an air mass flow feed upstream of an apparatus for mixing fuel, the charge air cooler forming a geometrically constant throttle for an air mass flow flowing therethrough;
providing a measuring device for determining the air mass flow;
measuring by a sensor system of the measuring device a pressure loss across the charge air cooler; and
calculating by a processing unit of the measuring device the air mass flow from the pressure loss measured by the sensor system using a charge air cooler model stored in the processing unit.

15. The method according to claim 14, further comprising calculating by the processing unit air mass flow from a pressure loss across a throttle valve, a throttle position of the throttle valve, and a throttle valve model stored in the processing unit, the throttle valve being a geometrically variable throttle for the air mass flow.

16. The method according to claim 15, wherein the internal combustion engine has a weak load range and a high load range, in the weak load range of the internal combustion engine the processing unit determines the air mass flow using the throttle valve model, and in a high load range the processing unit determines the air mass flow using the charge air cooler model.

17. The method according to claim 16, wherein the internal combustion engine has a middle load range between the weak load range and the high load range, in the middle load range, the air mass flow is determined by one of the throttle valve model, the charge air cooler model, or a comparison of the throttle valve model and the charge air cooler model.

18. The method according to claim 17, wherein in the middle load range, the one of the throttle valve model, the charge air cooler model, or a comparison of the throttle valve model and the charge air cooler model is used with lambda regulation.

19. The method according to claim 14, further comprising the steps of measuring by a manifold pressure sensor an intake manifold pressure, determining by the processing unit an overall mass flow of fresh air, combustion gas, and exhaust gas recirculation (EGR) gas based on the manifold pressure sensor and a volumetric efficiency model,
determining by the processing unit a combustion gas mass flow by one of injector duration of injectors of the internal combustion engine or by a lambda measurement by lambda probes, and
determining by the processing unit a proportion of recirculated exhaust gas as EGR rate by subtracting the determined air flow mass and the combustion mass gas flow from the overall mass flow.

20. The method according to claim 19, regulating by the processing unit the EGR rate.

21. The method according to claim 14, further comprising the steps of measuring an air cooler throttle characteristic as a constant characteristic for the charge air cooler model; and
using as the basis for the calculation of the air mass flow an approximately linear relationship between pressure loss across the charge air cooler and the air mass flow.

* * * * *